United States Patent
Shimamoto et al.

(10) Patent No.: US 11,418,675 B1
(45) Date of Patent: Aug. 16, 2022

(54) IMAGE FORMING APPARATUS, IMAGE FORMING METHOD, AND RECORDING MEDIUM

(71) Applicant: Kyocera Document Solutions Inc., Osaka (JP)

(72) Inventors: Kunihiko Shimamoto, Torrance, CA (US); Neil-Paul Payoyo Bermundo, Glendora, CA (US); Warren San Jose, Torrance, CA (US)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 17/165,961

(22) Filed: Feb. 3, 2021

(51) Int. Cl.
| | |
|---|---|
| *H04N 1/23* | (2006.01) |
| *H04N 1/00* | (2006.01) |
| *G06F 3/12* | (2006.01) |
| *G06K 15/02* | (2006.01) |

(52) U.S. Cl.
CPC ....... *H04N 1/2346* (2013.01); *H04N 1/00037* (2013.01); *H04N 1/2369* (2013.01)

(58) Field of Classification Search
None
See application file for complete search history.

(56) References Cited

U.S. PATENT DOCUMENTS

| | | | |
|---|---|---|---|
| 6,271,872 B1 | 8/2001 | Nagata | |
| 6,333,774 B1 * | 12/2001 | Ito | B41J 3/60 355/24 |
| 10,489,091 B2 | 11/2019 | Tsukamoto | |
| 2006/0227200 A1 * | 10/2006 | Rehmann | B41J 11/008 347/129 |
| 2013/0136314 A1 * | 5/2013 | Yamakawa | B41J 3/44 382/112 |
| 2013/0293929 A1 * | 11/2013 | Kakutani | H04N 1/0058 358/3.24 |
| 2017/0076185 A1 * | 3/2017 | Mizuno | H04N 1/0035 |
| 2017/0210581 A1 * | 7/2017 | Van Acquoij | B41J 11/0095 |
| 2017/0346956 A1 * | 11/2017 | Nakamura | G06F 3/1244 |

\* cited by examiner

*Primary Examiner* — Beniyam Menberu
(74) *Attorney, Agent, or Firm* — J-Pat U.S. Patent Legal Services; James Judge

(57) ABSTRACT

An image forming method: imaging an image forming medium in the image forming unit to generate medium image data representing the image forming medium; controlling an image formation in a plurality of modes including a single-side image forming mode and a duplex image forming mode; and detecting an ink stain based on tone differences between first medium image data and second medium image data by comparing the first medium image data as medium image data representing one surface of the image forming medium and the second medium image data as medium image data representing another surface of the image forming medium when the duplex image forming mode is selected. The controlling includes setting the whole image formable region as the target of the ejection restriction process in response to the detection of the ink stain to inhibit an ejection of the ink to the other surface.

20 Claims, 13 Drawing Sheets

Paper Sheet Contour Reading

Image Output

Mask Process (Folded Edge)

Mask Process (Hole)

IMAGE FORMING APPARATUS, IMAGE FORMING METHOD, AND RECORDING MEDIUM

BACKGROUND

Unless otherwise indicated herein, the description in this section is not prior art to the claims in this application and is not admitted to be prior art by inclusion in this section.

In the commercial printing industry, it is required that a large amount of printing processes are quickly executed while ensuring print quality. With respect to such a request, in a printing where a plurality of same or different images are imposed in one printing paper sheet, for example, there has been proposed a technique that ensures reprinting for each image on which an abnormality has occurred when any abnormality including a stain occurs at a print output. This technique ensures not conventionally reprinting the whole printing paper sheet, but the reprinting for each image, and therefore eliminates wasting of color material.

SUMMARY

An image forming method according to one aspect of the disclosure includes: storing an image forming medium in a medium storage unit; forming an image using an image forming unit that ejections an ink onto the image forming medium based on input image data to form an input image; conveying the image forming medium using a first conveying unit that conveys the image forming medium from the medium storage unit to the image forming unit, a second conveying unit that conveys the image forming medium from the image forming unit, a reverse conveying unit that conveys the image forming medium from the second conveying unit to reverse the image forming medium to convey the reversed image forming medium to the image forming unit, and a conveyance output unit that outputs the image forming medium from the second conveying unit; imaging the image forming medium in the image forming unit to generate medium image data representing the image forming medium; generating image formation control data for reproducing the input image data by forming ink dots in a plurality of pixels constituting the input image; using the medium image data to generate medium region data for identifying an image formable region as a region on the image forming medium on which the image is formable; controlling an image formation in a plurality of modes including a single-side image forming mode and a duplex image forming mode by selecting a target pixel from the plurality of pixels to determine whether the selected target pixel is located within the image formable region or not based on the medium region data, the target pixel being set as an ink ejection target when the selected target pixel is located within the image formable region, the target pixel being set as a target of an ejection restricted process at which the ejection of the ink is restricted when the selected target pixel is located outside the image formable region; and detecting an ink stain based on tone differences between first medium image data and second medium image data by comparing the first medium image data as medium image data representing one surface of the image forming medium and the second medium image data as medium image data representing another surface of the image forming medium when the duplex image forming mode is selected. The controlling includes setting the whole image formable region as the target of the ejection restriction process in response to the detection of the ink stain to inhibit an ejection of the ink to the other surface of the image forming medium.

An image forming apparatus according to another aspect of the disclosure includes: a medium storage unit that stores an image forming medium in a medium storage unit; an image forming unit that forms an image using an image forming unit that ejections an ink onto the image forming medium based on input image data to form an input image; a medium conveying unit that conveys the image forming medium using a first conveying unit that conveys the image forming medium from the medium storage unit to the image forming unit, a second conveying unit that conveys the image forming medium from the image forming unit, a reverse conveying unit that conveys the image forming medium from the second conveying unit to reverse the image forming medium to convey the reversed image forming medium to the image forming unit, and a conveyance output unit that outputs the image forming medium from the second conveying unit; a medium reading unit that images the image forming medium in the image forming unit to generate medium image data representing the image forming medium; an image processing unit that generates image formation control data for reproducing the input image data by forming ink dots in a plurality of pixels constituting the input image; a medium region setting unit that uses the medium image data to generate medium region data for identifying an image formable region as a region on the image forming medium on which the image is formable; a control unit that controls an image formation in a plurality of modes including a single-side image forming mode and a duplex image forming mode by selecting a target pixel from the plurality of pixels to determine whether the selected target pixel is located within the image formable region or not based on the medium region data, the target pixel being set as an ink ejection target when the selected target pixel is located within the image formable region, the target pixel being set as a target of an ejection restricted process at which the ejection of the ink is restricted when the selected target pixel is located outside the image formable region; and an ink stain detector that detects an ink stain based on tone differences between first medium image data and second medium image data by comparing the first medium image data as medium image data representing one surface of the image forming medium and the second medium image data as medium image data representing another surface of the image forming medium when the duplex image forming mode is selected. The controlling includes setting the whole image formable region as the target of the ejection restriction process in response to the detection of the ink stain to inhibit an ejection of the ink to the other surface of the image forming medium.

A non-transitory computer-readable recording medium according to yet another aspect of the disclosure stores a control program for controlling an image forming apparatus. The image forming apparatus includes a processor and a memory. The recording medium stores a program instruction. The image forming apparatus includes: a medium storage unit that stores an image forming medium in a medium storage unit; an image forming unit that forms an image using an image forming unit that ejections an ink onto the image forming medium based on input image data to form an input image; a medium conveying unit that conveys the image forming medium using a first conveying unit that conveys the image forming medium from the medium storage unit to the image forming unit, a second conveying unit that conveys the image forming medium from the image forming unit, a reverse conveying unit that conveys the image forming medium from the second conveying unit to reverse the image forming medium to convey the reversed image forming medium to the image forming unit, and a conveyance output unit that outputs the image forming medium from the second conveying unit. The program instruction causes the image forming apparatus to function as: a medium reading unit that images the image forming medium in the image forming unit to generate medium image data representing the image forming medium; an image processing unit that generates image formation control data for reproducing the input image data by forming ink dots in a plurality of pixels constituting the input image; a medium region setting unit that uses the medium image data to generate medium region data for identifying an image formable region as a region on the image forming medium on which the image is formable; a control unit that controls an image formation in a plurality of modes including a single-side image forming mode and a duplex image forming mode by selecting a target pixel from the plurality of pixels to determine whether the selected target pixel is located within the image formable region or not based on the medium region data, the target pixel being set as an ink ejection target when the selected target pixel is located within the image formable region, the target pixel being set as a target of an ejection restricted process at which the ejection of the ink is restricted when the selected target pixel is located outside the image formable region; and an ink stain detector that detects an ink stain based on tone differences between first medium image data and second medium image data by comparing the first medium image data as medium image data representing one surface of the image forming medium and the second medium image data as medium image data representing another surface of the image forming medium when the duplex image forming mode is selected. The controlling includes setting the whole image formable region as the target of the ejection restriction process in response to the detection of the ink stain to inhibit an ejection of the ink to the other surface of the image forming medium.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
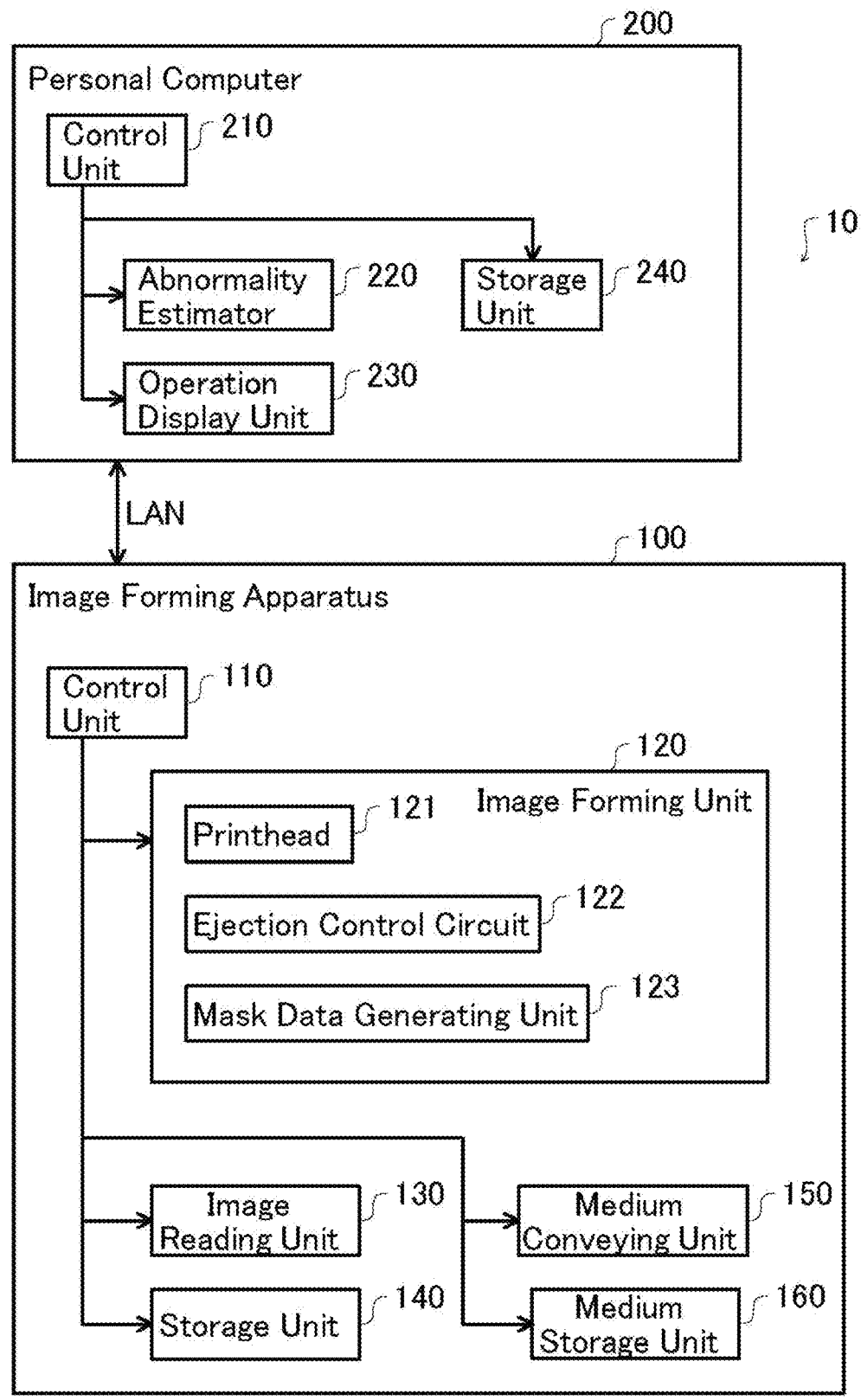
FIG. 1 illustrates a block diagram of a functional configuration of an image forming system according to one embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes a configuration for implementing the disclosure (hereinafter referred to as an "embodiment") with reference to the drawings.

FIG. 1 illustrates a block diagram of a functional configuration of an image forming system 10 according to one embodiment of the disclosure. The image forming system 10 includes an image forming apparatus 100, a personal computer 200, and a LAN. The LAN connects the personal computer 200 to the image forming apparatus 100. The image forming apparatus 100 of this embodiment is an inkjet color printer.

Figure 2:
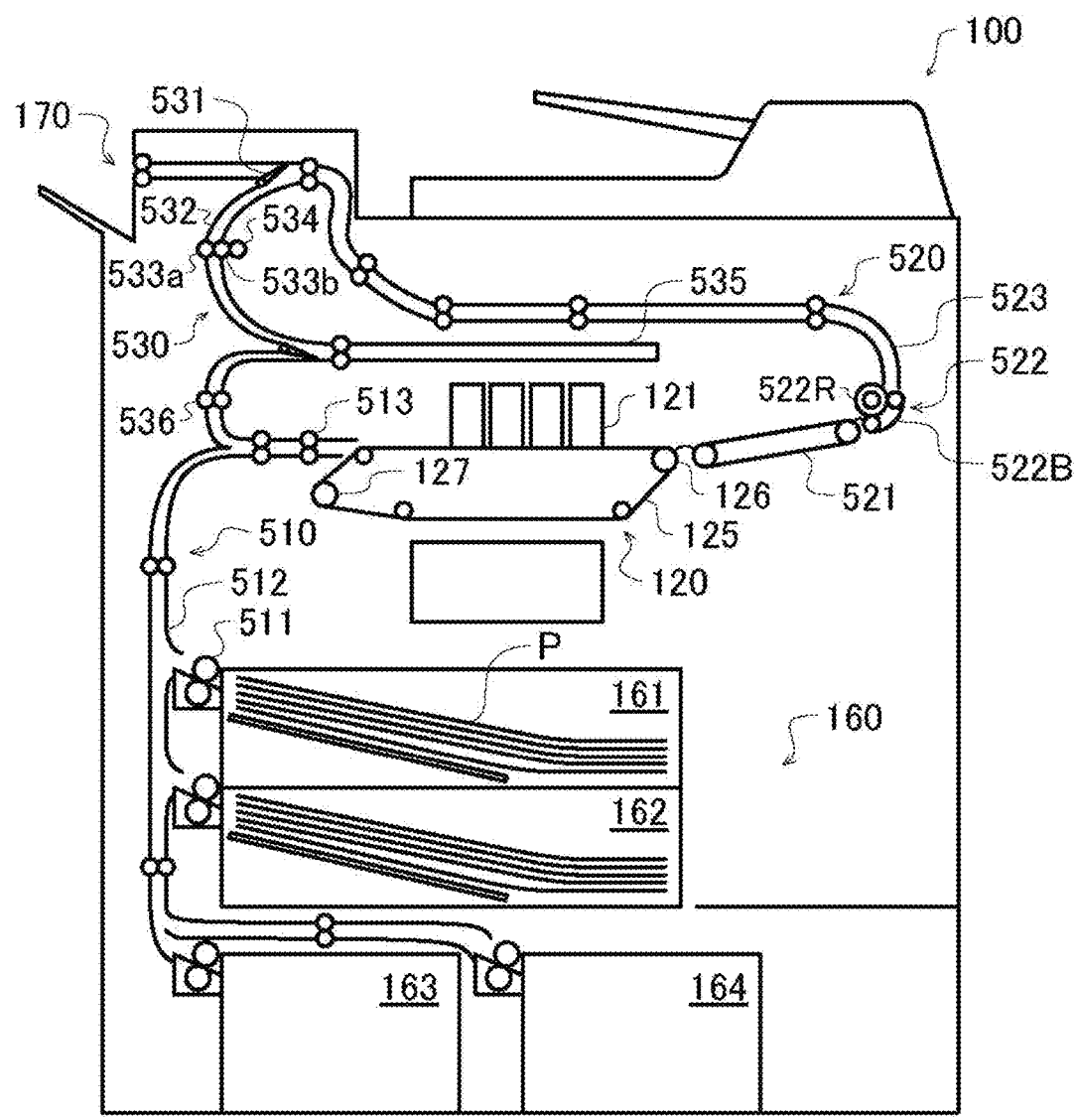
FIG. 2 illustrates a cross-sectional view illustrating an overall configuration of an image forming apparatus according to the one embodiment.

The image forming apparatus 100 includes a control unit 110, an image forming unit 120, an image reading unit 130, a storage unit 140, a medium conveying unit 150, a medium storage unit 160, and a printed matter discharge unit 170 (see FIG. 2). The image forming unit 120 includes a printhead 121, an ejection control circuit 122, and a mask data generating unit 123. Corresponding to respective colors of magenta, cyan, yellow, and black, the printhead 121 has respective line heads that eject the respective colors of inks. The image forming unit 120 is also referred to as a medium reading unit. The printed matter discharge unit 170 is also referred to as a conveyance output unit.

The personal computer 200 includes a control unit 210, an abnormality estimator 220, an operation display unit 230, and a storage unit 240. The control unit 210 functions as an image processing unit and executes a color conversion process and a halftone process (RIP process) on input image data to generate print data as dot data for reproducing the input image using the inks used in the image forming unit 120. The operation display unit 230 functions as a touch panel and displays various menus as an input screen to accept an operation input from a user. Functions of the abnormality estimator 220 will be described later. The print data is also referred to as image formation control data. While in this embodiment the personal computer 200 executes the RIP process, for example, the image forming apparatus 100 may execute it.

The control units 110 and 210 include main storage units such as RAMS and ROMs, and control units, such as Micro Processing Units (MPUs) and Central Processing Units (CPUs). The storage units 140 and 240 include storage devices (not illustrated) formed of, for example, the hard disk drive flash, the memory, and non-transitory recording media that store, for example, control programs (including image forming program) of the process executed by the personal computer 200, and image data.

FIG. 2 illustrates a cross-sectional view illustrating an overall configuration of the image forming apparatus 100 according to the one embodiment. The medium storage unit 160 includes a first medium storage unit 161, a second medium storage unit 162, a third medium storage unit 163, and a fourth medium storage unit 164. The first medium storage unit 161 and the second medium storage unit 162 can store, for example, A3-size printing paper sheets, and the third medium storage unit 163 and the fourth medium storage unit 164 can store A4-size printing paper sheets. The medium storage unit 160 may be configured to store a roll (not illustrated) of roll paper and supply the roll paper as a print medium from the roll of the roll paper.

The medium conveying unit 150 (see FIG. 1) includes a first conveying unit 510, a second conveying unit 520, and a reverse conveying unit 530. In a single-side printing mode (single-side image forming mode), the first conveying unit 510 conveys a printing paper sheet P before image formation from the medium storage unit 160 to the image forming unit 120. After the image forming unit 120 forms an image on a front surface of the printing paper sheet P, the second conveying unit 520 conveys the printing paper sheet P after the image formation from the image forming unit 120 to the printed matter discharge unit 170. The reverse conveying unit 530 is used in a duplex printing mode (duplex image forming mode). The printing paper sheet P is an exemplary image forming medium.

In the duplex printing mode, similarly to the single-side printing mode, the first conveying unit 510 conveys the printing paper sheet P before image formation from the medium storage unit 160 to the image forming unit 120. After the image forming unit 120 forms the image on the front surface of the printing paper sheet P, the second conveying unit 520 conveys the printing paper sheet P not to the printed matter discharge unit 170 but to the reverse conveying unit 530. The reverse conveying unit 530 reverses the front surface and the back surface of the printing paper sheet P and conveys it to the image forming unit 120. The image forming unit 120 forms an image on the back surface of the printing paper sheet P. The second conveying unit 520 conveys the printing paper sheet P after the image formation on the back surface from the image forming unit 120 to the printed matter discharge unit 170.

The first conveying unit 510 includes a pickup roller (not illustrated), a pair of feed rollers 511, a first conveyance guide 512, and a registration roller 513. In the first conveying unit 510, the pickup roller (not illustrated) takes out the printing paper sheets P one by one from, for example, the first medium storage unit 161, and the pair of feed rollers 511 conveys the printing paper sheet P to inside of the first conveyance guide 512 and conveys it to the registration roller 513. While correcting skewed feeding of the printing paper sheet P in accordance with an ejection timing of the respective colors of inks from the printhead 121, the registration roller 513 conveys it to the image forming unit 120.

The image forming unit 120 includes the printhead 121, printing belt conveying mechanisms 125 to 127. The printing belt conveying mechanisms include the drive roller 126, the plurality of driven rollers 127, and the endless printing conveyance belt 125 wound therearound. The printing conveyance belt 125 circulates clockwise by a driving power from the drive roller 126.

On the printing conveyance belt 125, multiple throughholes (ventholes, not illustrated) for suctioning air are formed at a predetermined density. In the position opposed to a back side (inside) of the printing conveyance belt 125, a paper sheet suctioning unit (not illustrated) is located. The paper sheet suctioning unit (not illustrated) has a surface on the side opposed to the printhead 121, and multiple throughholes for suctioning air are formed at a predetermined density thereon. The paper sheet suctioning unit can internally suction air from a surface on the printhead 121 side toward the other side (lower side) using a fan.

The printing paper sheet P is placed onto the printing conveyance belt 125 at the above-described predetermined timing by the registration roller 513 and is suctioned by the printing conveyance belt 125 to become flat. The respective line heads of the printhead 121 sequentially eject the respective colors of inks of magenta, cyan, yellow, and black to form the image on the printing paper sheet P. The printing conveyance belt 125 conveys the printing paper sheet P after the image formation to the second conveying unit 520.

The second conveying unit 520 includes a drying belt conveying mechanism 521, a warp correcting unit 522, and a second conveyance guide 523. The drying belt conveying mechanism 521 has a mechanism to suction the printing paper sheet P similarly to the printing conveyance belt 125. The warp correcting unit 522 is a mechanism for correcting a curve of the printing paper sheet P, which has absorbed the ink and has been dried.

The warp correcting unit 522 includes a particle roller 522R, as a driven roller, and an endless belt driving unit 522B. The particle roller 522R is configured to have an outer peripheral surface on which multiple particles are fixedly secured and contact with a printing surface of the printing paper sheet P. The belt driving unit 522B includes an endless belt that is stretched around two support rollers and has a surface coated with Teflon®.

The printing paper sheet P is placed on the drying belt conveying mechanism 521 from the printing conveyance belt 125, is conveyed in a state where the printing paper sheet P is suctioned by the drying belt conveying mechanism 521 to be dried, and then is conveyed to the warp correcting unit 522. The warp correcting unit 522 corrects the curve of the printing paper sheet P and conveys the printing paper sheet P to inside of the second conveyance guide 523. The second conveyance guide 523 can convey the printing paper sheet up to the printed matter discharge unit 170. The printed matter discharge unit 170 discharges the printing paper sheet P, on which printing has already been executed, to outside of the image forming apparatus 100. The reverse conveying unit 530, which is used when duplex printing is performed, is connected to the second conveyance guide 523.

The reverse conveying unit 530 includes a conveying path switching mechanism 531, a third conveyance guide 532, a pair of warp correcting rollers 533 (533a, 533b), a cleaning roller 534, a reversing tray 535, and a paper refeeding guide 536. The conveying path switching mechanism 531 can switch the path from the second conveyance guide 523 to the printed matter discharge unit 170 to the path from the second conveyance guide 523 to the reverse conveying unit 530.

The pair of warp correcting rollers 533 is a roller pair that has mutually different elastic moduli and diameters.

The warp correcting rollers 533 are configured as a pair of: a first roller 533a that has a small elastic modulus and a large diameter, and a second roller 533b that has a large elastic modulus and a relatively small diameter compared with those of the first roller 533a. The first roller 533a is a roller that has, for example, an elastic layer made of a foamed silicone rubber on an outer peripheral surface and has the diameter of around 1 inch. The second roller 533b is a metallic roller that has, for example, the diameter of a few mm.

The warp correcting rollers 533 thus configured ensure the sufficient correcting effect by sandwiching with a nip portion between the first roller 533a and the second roller 533b while the second roller 533b contacts a print surface (the front surface on which the image has been formed). This causes the printing paper sheet P to be sufficiently suctioned and held to the printing conveyance belt 125 to keep the distance between the printhead 121 and the printing paper sheet P uniform, which can ensure the image quality.

The cleaning roller 534 is in pressure contact with the second roller 533b on an opposite side of the nip portion between the first roller 533a and the second roller 533b. The cleaning roller 534 is a felt roller on which a felt is wound around an outer peripheral surface of its main body. The cleaning roller 534 is driven-rotated by driving of the second roller 533b, thus ensuring wiping off the ink attached to the second roller 533b.

The warp correcting roller 533 conveys the printing paper sheet P to the reversing tray 535 and conveys it to the paper refeeding guide 536 after the printing paper sheet P is switched back. This switching back causes the printing paper sheet P to have the reversed back and front sides. The paper refeeding guide 536 conveys the printing paper sheet P, which has the reversed back and front, up to the registration roller 513. While correcting the skewed feeding of the printing paper sheet P in accordance with the ejection timing of the respective colors of inks from the printhead 121, the registration roller 513 conveys it to the image forming unit 120. This enables the image forming unit 120 to perform printing on the back surface of the printing paper sheet P.

Figure 3:
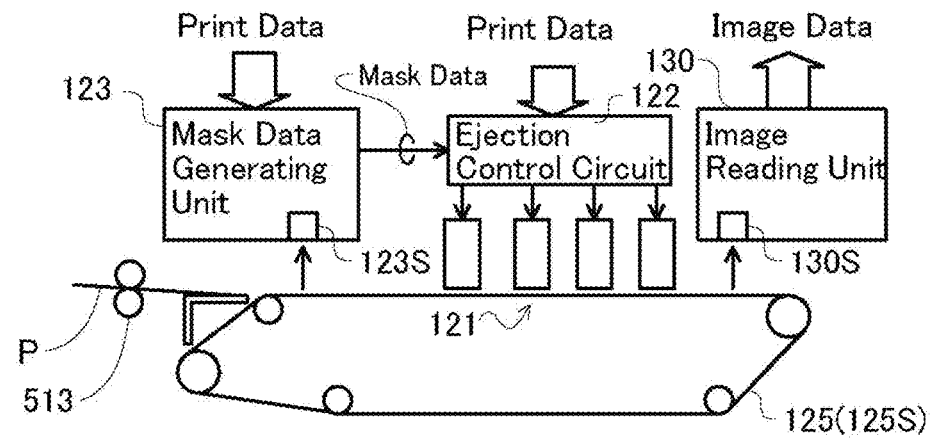
FIG. 3 illustrates a content of a mask process according to the one embodiment.
Figure 3:
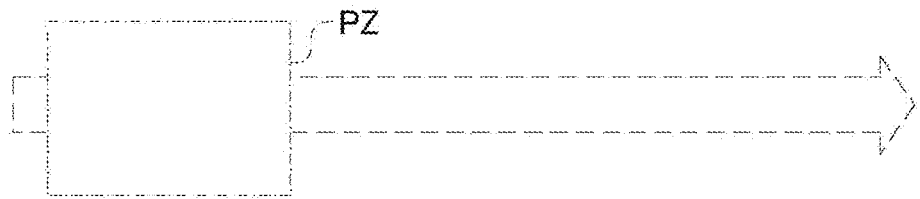
Figure 3:
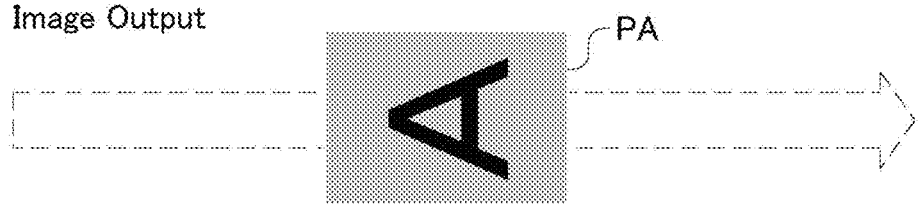
Figure 3:
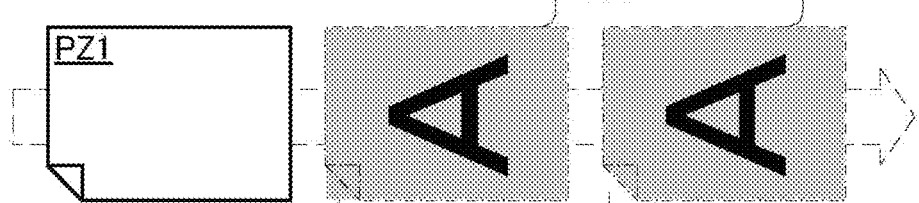
Figure 3:
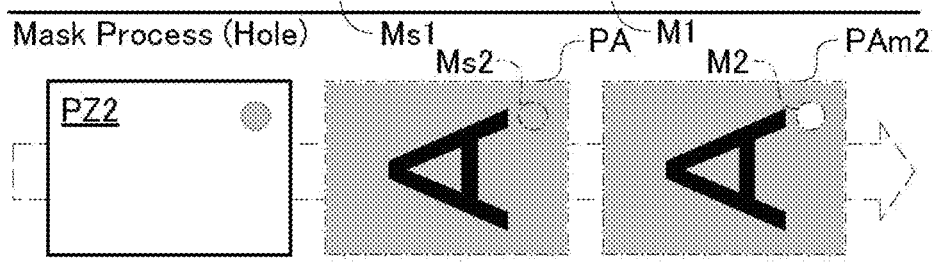

FIG. 3 illustrates a content of a mask process according to the one embodiment. The mask data generating unit 123 includes a CIS type monochrome line scanner 123S. The monochrome line scanner 123S is also referred to as a monochrome sensor and is arranged in the conveying path for conveying the printing paper sheet P to the image forming unit 120. The monochrome line scanner 123S includes a light source (not illustrated) and one CCD line sensor (not illustrated). The light source irradiates the printing paper sheet P conveyed in the sub-scanning direction on the printing conveyance belt 125. The CCD line sensor is arranged along the main-scanning direction intersecting with the conveyance direction.

The monochrome line scanner 123S images the printing paper sheet P conveyed in the sub-scanning direction on the printing conveyance belt 125 to generate medium image data. The mask data generating unit 123 generates medium region data representing a medium region PZ of the printing paper sheet P from the medium image data. The medium region PZ is a region where the printing paper sheet P, which receives the inks of CMYK, exists. Meanwhile, the print data is dot data representing a state of forming CMYK dots (ink dots) after Raster Image Processing (RIP) process and has a print target region PA. A method for generating the medium region data from the medium image data will be described later.

The mask data generating unit 123 functions as a medium region setting unit and detects a formation of a dot in a region where the printing paper sheet P does not exist, that is, an ejection outside a medium to generate the medium region data for eliminating the ejection outside the medium. This enables the image forming apparatus 100 to reduce the contamination due to the ink on a printed matter via, for example, the printing conveyance belt 125 caused by the ejection outside the medium.

Specifically, when a folded edge occurs on the printing paper sheet P (see FIG. 3), the monochrome line scanner 123S generates the medium region data indicating a medium region PZ1. This causes the image forming unit 120 to restrict the ejection of the ink to the region other than the medium region PZ1 within the print target region PA, that is, eliminate the ejection of the ink to an ejection-outside-of-medium region Ms1 to generate a mask processed printed matter PAm1 including a mask region M1. Meanwhile, when there is a hole in the printing paper sheet P (see FIG. 3), the monochrome line scanner 123S generates the medium region data indicating a medium region PZ2. This causes the image forming unit 120 to eliminate the ejection of the ink to an ejection-outside-of-medium region Ms2 within the print target region PA to generate a mask processed printed matter PAm2 including a mask region M2.

The image reading unit 130 includes a CIS type color line scanner 130S that is arranged along the main-scanning direction. The image reading unit 130 includes a light source (not illustrated) and three CCD line sensors (not illustrated) of RGB. The light source irradiates the printed matter conveyed in the sub-scanning direction on the printing conveyance belt 125. The CCD line sensors are arranged along the main-scanning direction. The image reading unit 130 is used for a printed matter quality confirmation process that is a process of confirming a quality of the printed matter where a desired image is formed on the printing paper sheet. The printed matter discharge unit 170 discharges the printed matter having the quality confirmed at the printed matter quality confirmation process. The image reading unit 130 is not limited to a scanner, such as the CIS type color line scanner 130S, and may be a sensor that can execute the printed matter quality confirmation process.

Figure 4:
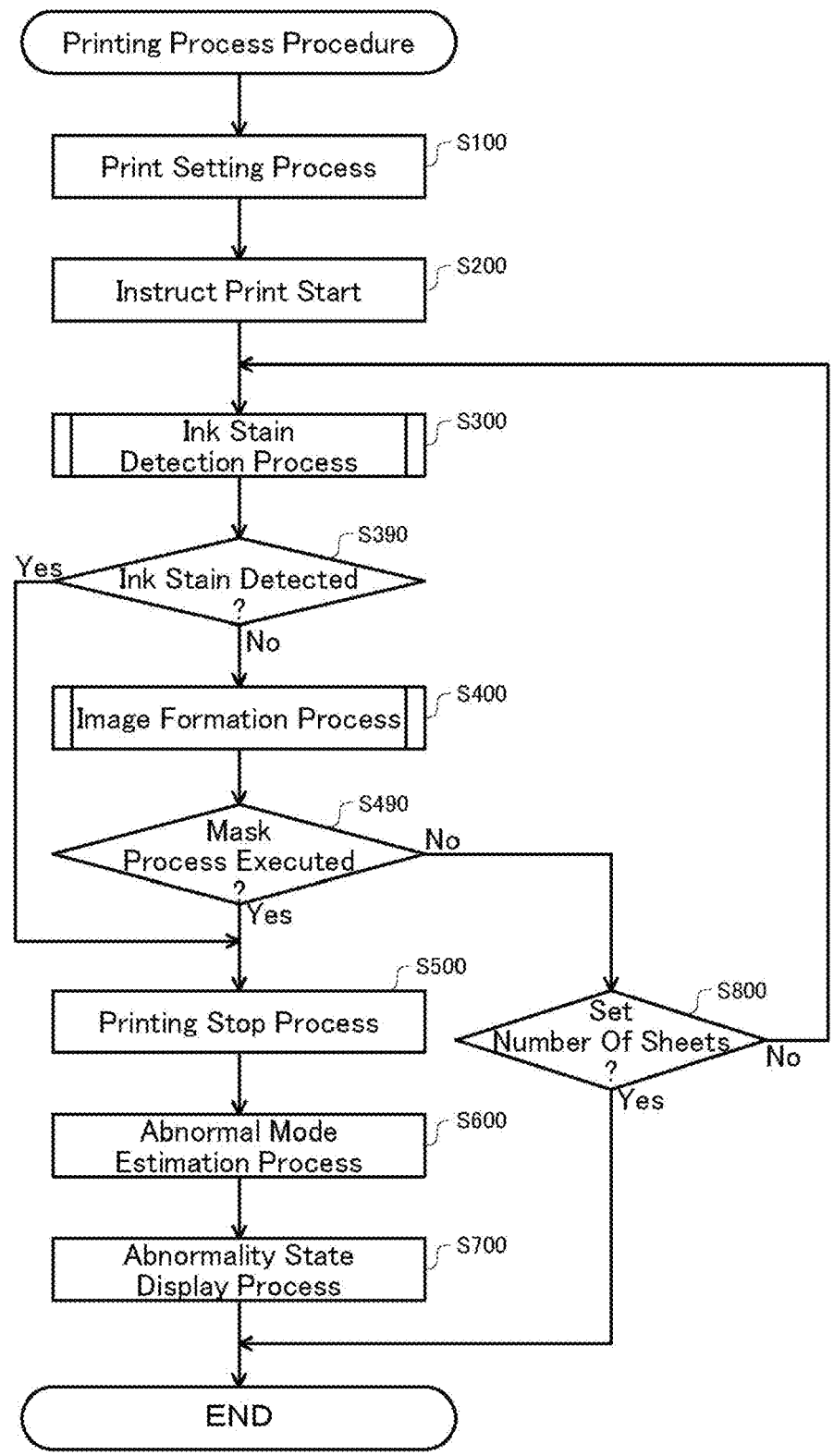
FIG. 4 illustrates a content of a printing process procedure according to the one embodiment.

FIG. 4 illustrates a content of a printing process procedure according to the one embodiment. At Step S100, the user performs the print setting process. At the print setting process, the user confirms a state of the image data in the operation display unit 230 of the personal computer 200 and sets, for example, a method of the halftone process and the number of sheets to be printed.

At Step S200, the user confirms a state of the print setting and instructs "print start" from the personal computer 200. This causes the image forming system 10 to start a printing process, which advances the process to Step S300.

Figure 5:
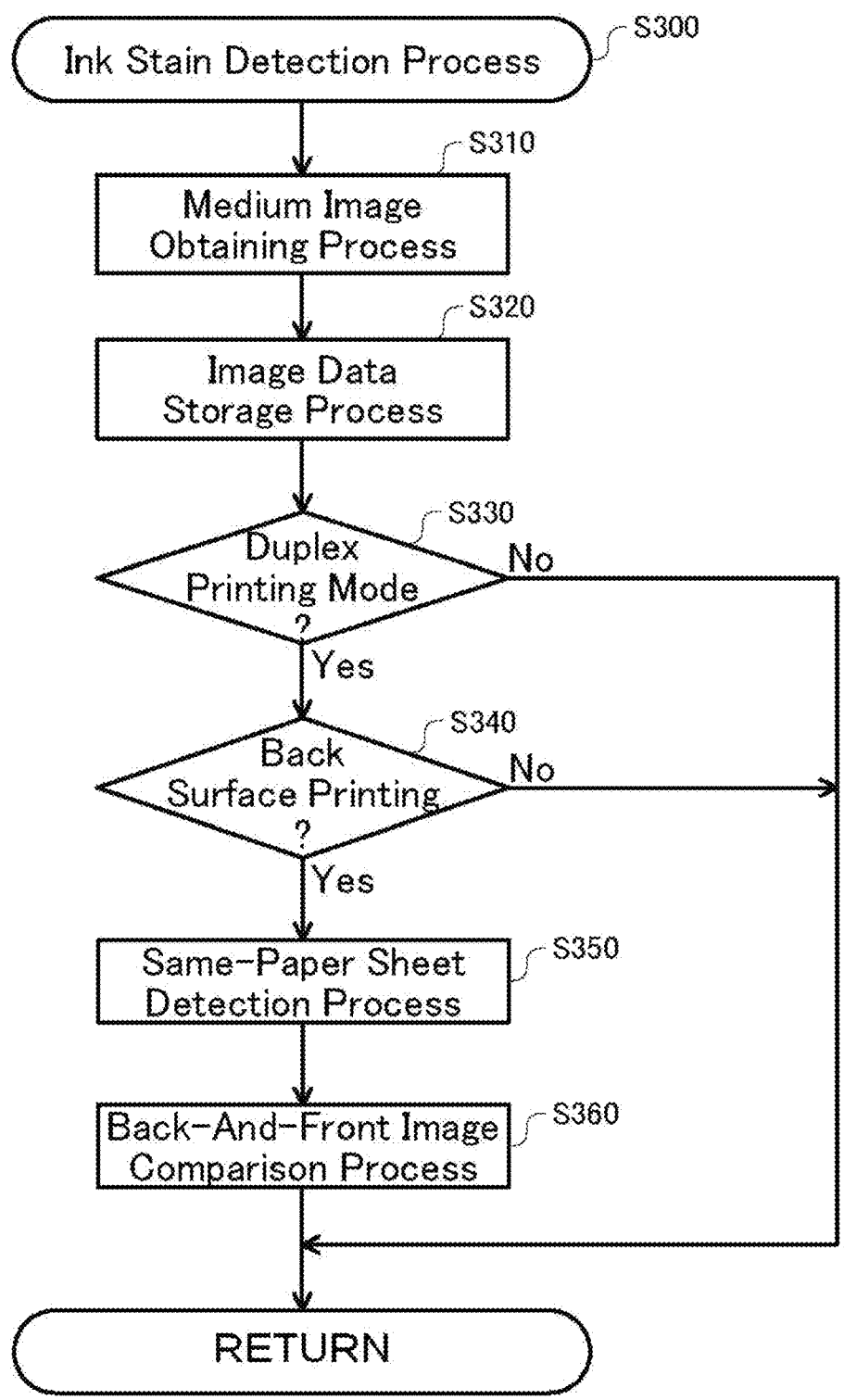
FIG. 5 illustrates a content of an ink stain detection process according to the one embodiment.

FIG. 5 illustrates a content of an ink stain detection process (Step S300) according to the one embodiment. In this embodiment, the ink stain detection process is executed at the duplex printing mode or in response to an instruction for an ink stain detection request from the user. In this example, as described below, it is assumed that the ink stain detection process is executed in the duplex printing mode.

At Step S310, the image forming apparatus 100 executes a medium image obtaining process. At the medium image obtaining process, the mask data generating unit 123 obtains the image on the front surface of the printing paper sheet P using the monochrome line scanner 123S to generate the medium image data having luminance values as monochrome image data.

At Step S320, the image forming apparatus 100 executes an image data storage process. At the image data storage process, the mask data generating unit 123 stores the medium image data in the storage unit 140.

At Step S330, the control unit 110 determines whether a current printing mode is the duplex printing mode or not. When the current printing mode is the duplex printing mode, the process is advanced to Step S340. When the current printing mode is not the duplex printing mode, the process is advanced to Step S390 (see FIG. 4).

At Step S340, the control unit 110 determines whether printing to be executed next is a back surface printing or not. When the printing to be executed next is the back surface printing, the process is advanced to Step S350. When the printing to be executed next is not the back surface printing, the process is advanced to Step S390.

At Step S350, the control unit 110 executes a same-paper sheet detection process. At the same-paper sheet detection process, the control unit 110 identifies the medium image data indicating the image on the front surface of the printing paper sheet P on which the printing is to be executed on the back surface next. That is, the control unit 110 identifies the printing paper sheet P that is the same as the printing paper sheet P on which the back surface printing is to be executed and identifies the medium image data indicating the image on the front surface based on the passing number of printing paper sheets P until the back surface printing, that is, for example, the number of imaging times performed by the monochrome line scanner 123S, and the number of printing paper sheets inside the image forming unit 120, the second conveying unit 520, and the reverse conveying unit 530.

At Step S360, the control unit 110 executes a back-and-front image comparison process. At the back-and-front image comparison process, the control unit 110 calculates the difference between luminance values of the medium image data of the obtained back surface image and luminance values of the medium image data of the identified front surface image to generate differential image data. After a low-pass filter is applied to the differential image data, the control unit 110 compares a preliminarily set threshold value to detect an ink stain.

At Step S390 (see FIG. 4), when pixels having tone differences of the luminance values larger than the preliminarily set threshold value are continuous to have an area equal to or more than a preliminarily set area, the control unit 110 determines that the ink stain is detected. When the control unit 110 determines that the ink stain is detected, the process is advanced to Step S500. When the control unit 110 has not determined the ink stain was detected, the process is advanced to Step S400. In this example, first, the case where the ink stain is detected will be described.

At Step S500, the control unit 110 executes a printing stop process. At the printing stop process, the control unit 110 stops a paper feeding from the medium storage unit 160. Meanwhile, the control unit 110 sets all of pixel values in the medium region data to "1" and continues an actuation of the medium conveying unit 150. This enables the image forming apparatus 100 to discharge all of the printing paper sheets P inside the medium conveying unit 150 from the printed matter discharge unit 170 while the ejection of the ink from the printhead 121 is completely stopped by the mask process. The mask process will be described later.

At Step S600, the abnormality estimator 220 executes an abnormal mode estimation process. At the abnormal mode estimation process, the abnormality estimator 220 estimates a cause of the ink stain based on the differential image data. Specifically, the abnormality estimator 220 estimates the cause of the ink stain through a matching process between image patterns of the ink stain preliminarily registered in an ink stain image database and an image pattern represented by the differential image data.

Figure 6:
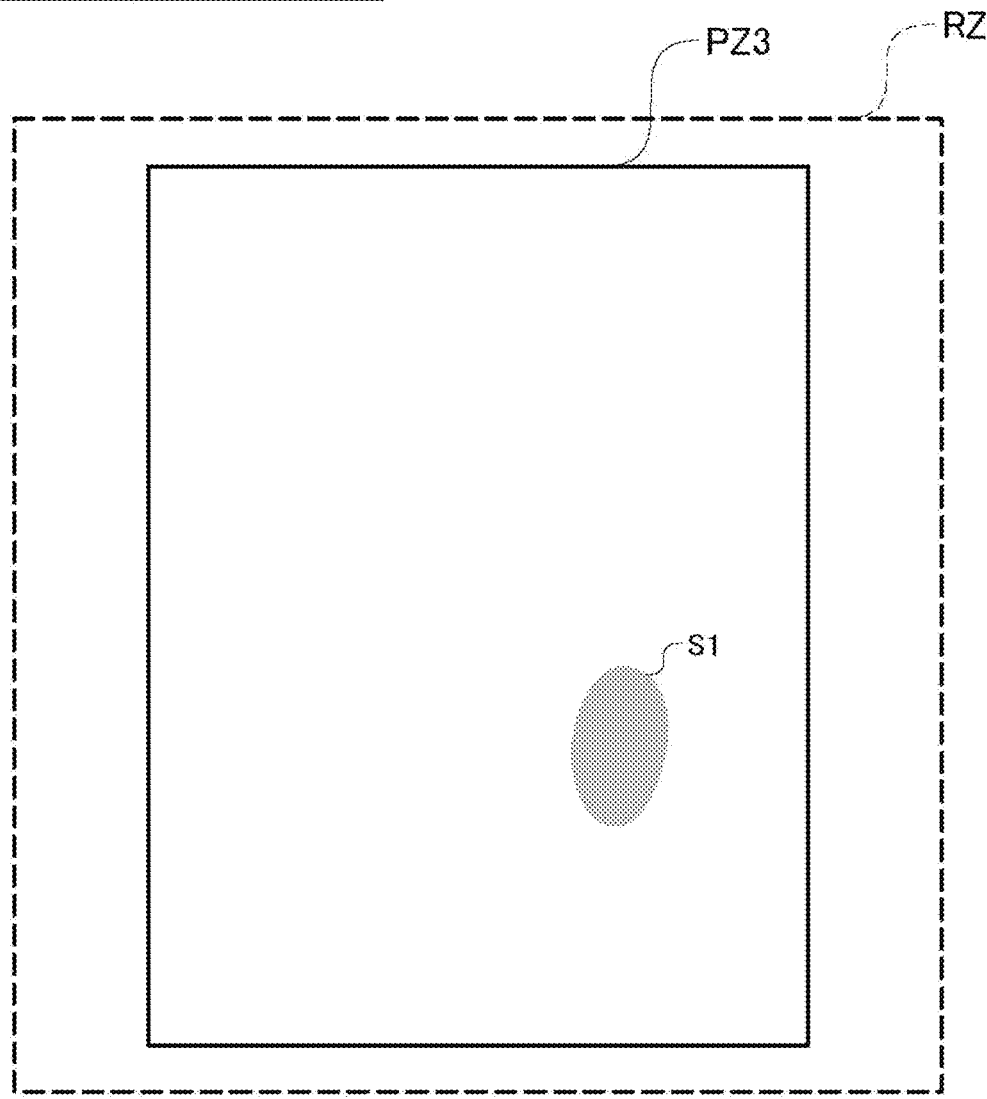
FIG. 6 illustrates a state of an island-shaped ink stain on a printing paper sheet.

FIG. 6 illustrates a state of an island-shaped ink stain S1 on the printing paper sheet. In a medium region PZ3 within an image reading zone RZ, the ink stain S1 has an island shape, that is, an isolated spot shape. According to the finding of the inventor of this application, the ink stain having the spot shape is generated, as the cause thereof, because the ink attached on a medium conveying surface 125S (see FIG. 12) of the printing conveyance belt 125 is transferred onto the printing paper sheet P. Note that, the "island shape" is an isolated image region and means a shape within a range (for example, 3:1) where a ratio of a length in the conveyance direction to a length in a direction perpendicular to the conveyance direction, that is, a specific aspect ratio is preliminarily set.

It is assumed that in the ink stain image database, an image pattern of the island-shaped ink stain is associated with the cause of the ink stain, and they are registered, for example, in each field of the same record. In this example, a storage position (path or directory) of the data representing the image pattern and a file name are registered in the field of the image pattern of the ink stain caused by the ink attached to the conveyance belt, text data of "island-shaped stain" is registered in the field of an ink stain pattern, and text data of "conveyance belt" (corresponding to the printing conveyance belt) is registered in the field of the cause of the ink stain.

At Step S700, the abnormality estimator 220 functions as an ink stain detector and executes an abnormality state display process. At the abnormality state display process, the abnormality estimator 220 searches the record where the file of the most similar (that is, less different) image pattern is registered with reference to the ink stain image database and obtains the text data of "island-shaped stain" and the text data of "conveyance belt." The abnormality estimator 220 searches the record using the texts of "island-shaped stain" and "conveyance belt" to select any of a plurality of kinds of preliminarily prepared abnormality state displays.

Figure 7:
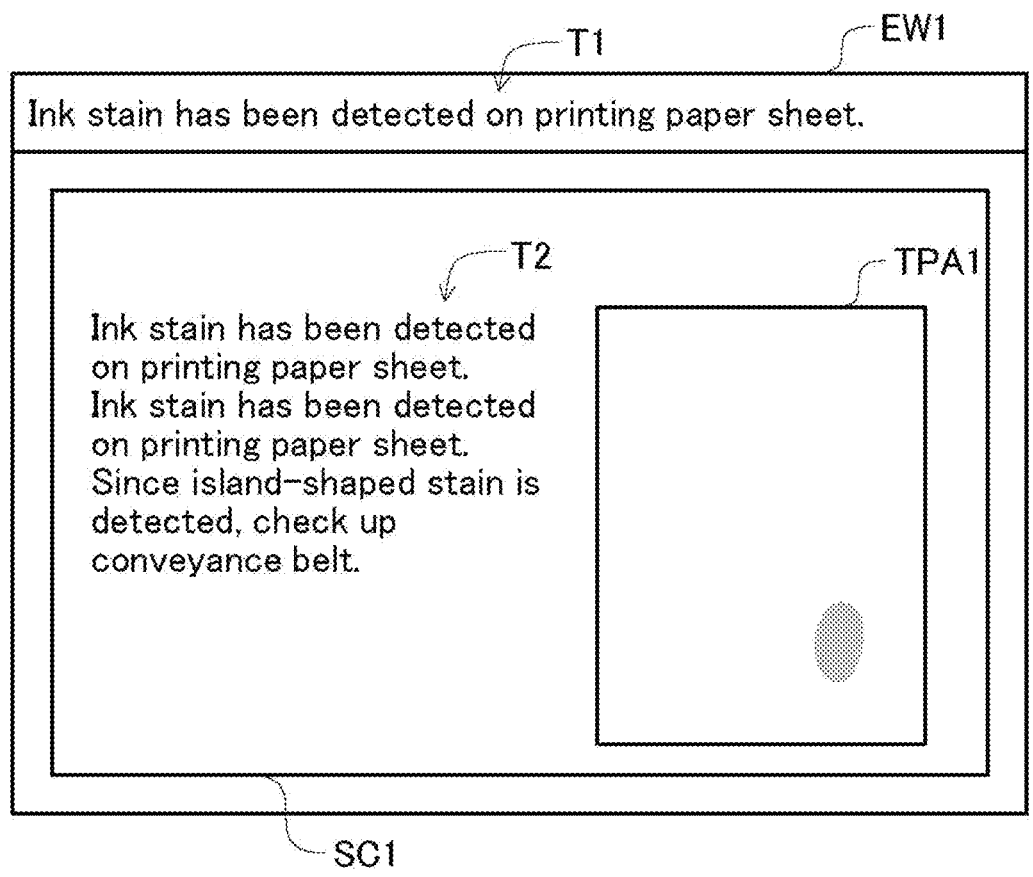
FIG. 7 illustrates an error display screen that displays the state of the island-shaped ink stain.

FIG. 7 illustrates an error display screen that displays the state of the island-shaped ink stain. An error display screen EW1 includes a text message T1 indicating that the ink stain is detected on the printing paper sheet and a description region SC1 illustrating its state. The description region SC1 includes a text message T2 indicating a state of an abnormality estimation result and an ink stain state image TPA1 where a state of the differential image data is emphasized as necessary to be displayed. The text message T1 and the text message T2 are generated by the abnormality estimator 220, for example, by preparing them from a list of preliminarily prepared text messages.

The text message T1 is a text display of "Ink stain has been detected on printing paper sheet." and indicates the abnormality state that the ink stain is detected outside the printing paper sheet, and the printing is stopped. The text message T2 indicates that an ink stain state of the printing paper sheet P is "island-shaped stain," and the abnormality estimator 220 estimates that the cause thereof is that the ink is attached to "conveyance belt." The text message representing the ink stain state of the printing paper sheet P is also referred to as a first text message. The text message representing the cause of the ink stain of the printing paper sheet P is also referred to as a second text message.

Figure 8:
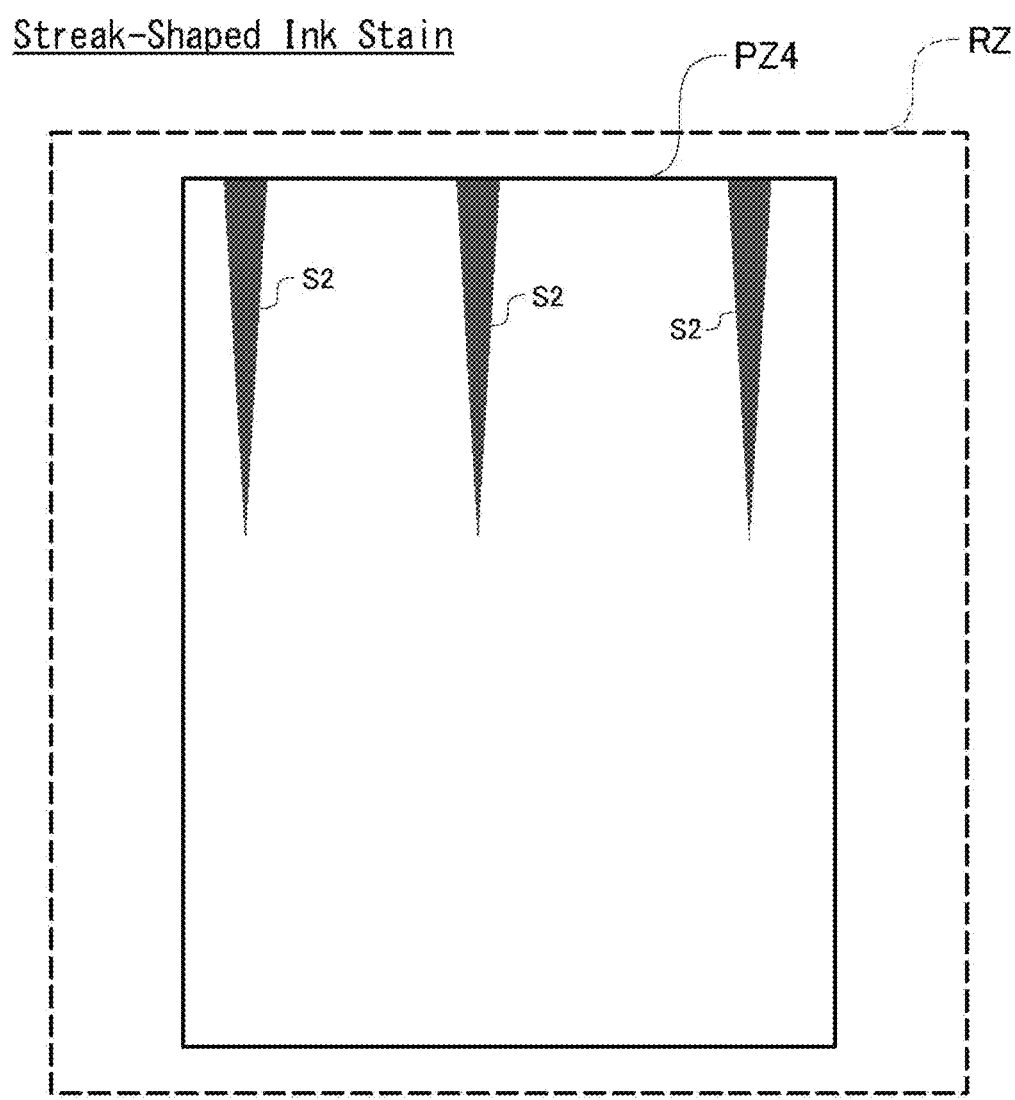
FIG. 8 illustrates a state of a streak-shaped ink stain on the printing paper sheet.
Figure 8:
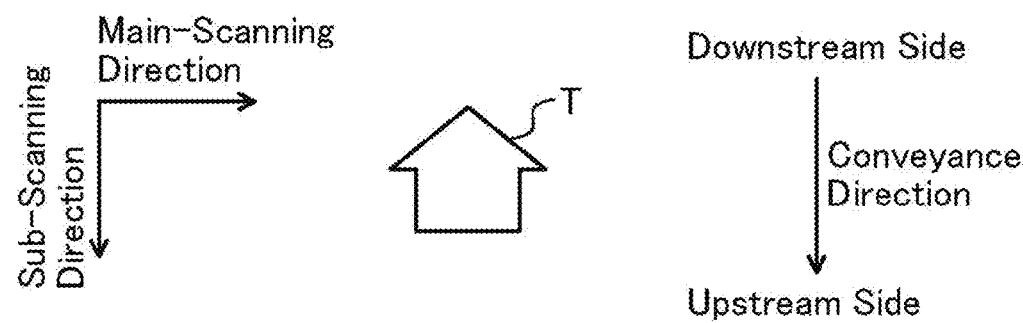

FIG. 8 illustrates a state of a streak-shaped ink stain on the printing paper sheet. In a medium region PZ4 within the image reading zone RZ, three streak-shaped ink stains S2 have a shape having specific streak shapes, that is, one or more streak shapes (linear shapes) starting from the end portion on the downstream side in the conveyance direction. According to the finding of the inventor of this application, the ink stain having one or more streak shapes starting from the end portion on the downstream side in the conveyance direction is generated, as the cause thereof, because the ink attached on the particle roller 522R of the warp correcting unit 522 is transferred onto the printing paper sheet P.

In the ink stain image database, the specific streak-shaped image pattern is associated with the cause of the ink stain, a storage position of the data representing the image pattern and a file name are registered in the field of the image pattern of the ink stain caused by the ink attached to the particle roller 522R, text data of "specific streak-shaped stain" is registered in the field of an ink stain pattern, and text data of "warp correcting unit" (decurler) is registered in the field of the cause of the ink stain.

At Step S700, the abnormality estimator 220 executes the abnormality state display process. At the abnormality state display process, the abnormality estimator 220 searches the record where the file of the most similar image pattern is registered with reference to the ink stain image database and obtains the text data of "streak-shaped stain" and the text data of "warp correcting unit." The abnormality estimator 220 searches the record using the text data of "streak-shaped stain" and "warp correcting unit" to select any of a plurality of kinds of preliminarily prepared abnormality state displays.

Figure 9:
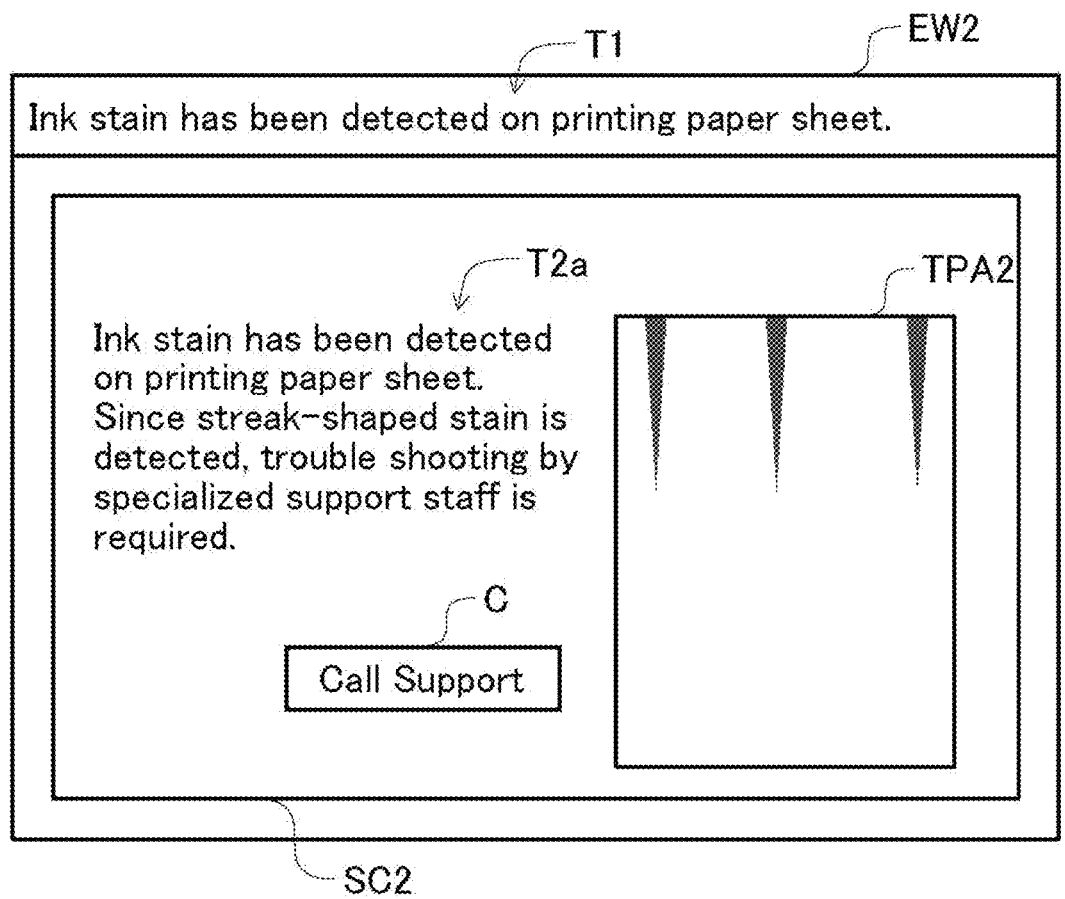
FIG. 9 illustrates the error display screen that displays the state of the streak-shaped ink stain.

FIG. 9 illustrates the error display screen that displays the state of the streak-shaped ink stain. An error display screen EW2 includes the text message T1 indicating that the ink stain is detected on the printing paper sheet and a description region SC2 illustrating its state. The description region SC2 includes a text message T2a indicating a state of an abnormality estimation result, an ink stain state image TPA2 where a state of the differential image data is emphasized as necessary to be displayed, and an icon C for automatically calling the support service. The text message T1 and the text message T2a are generated by the abnormality estimator 220, for example, by preparing them from a list of preliminarily prepared text messages.

The text message T1 is the text display of "Ink stain has been detected on printing paper sheet." and indicates the abnormality state that the ink stain is detected outside the printing paper sheet, and the printing is stopped. The text message T2a indicates that an ink stain state of the printing paper sheet P is "streak-shaped stain," the abnormality estimator 220 estimates that the cause thereof is that the ink is attached to "warp correcting unit" and a support by a specialized support staff is required. When the user touches the icon C, the state on the error display screen and the differential image data are automatically transmitted to the support company.

It is assumed that such an ink stain is caused by, for example, an excessive ejection of the ink due to an abnormality of the printhead 121 and/or a wrong paper feeding of the printing paper sheets having mutually different ink absorbances, and the ink stain is generated by the ink exuding in the warp correcting unit 522.

Figure 10A:
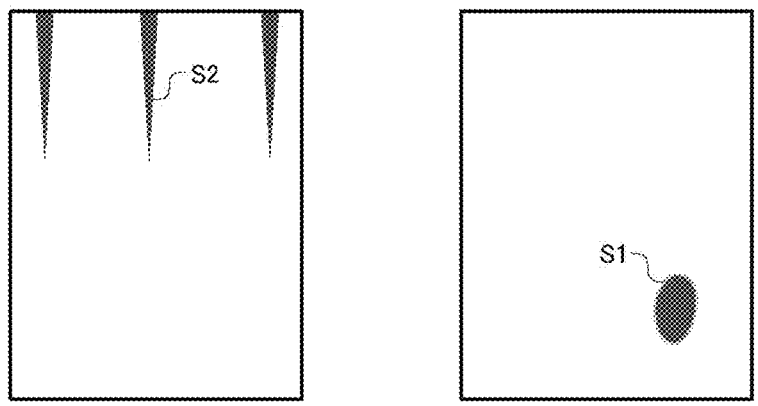
FIGS. 10A to 10C illustrate differential image data representing the printing paper sheet to be ejected after the ink stain is detected.
Figure 10B:
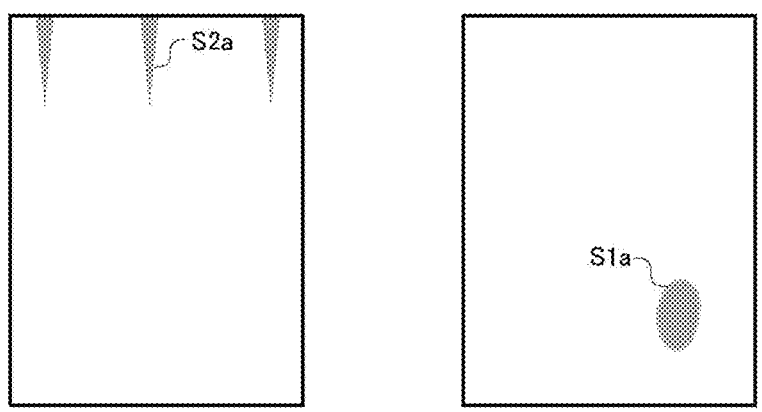
Figure 10C:
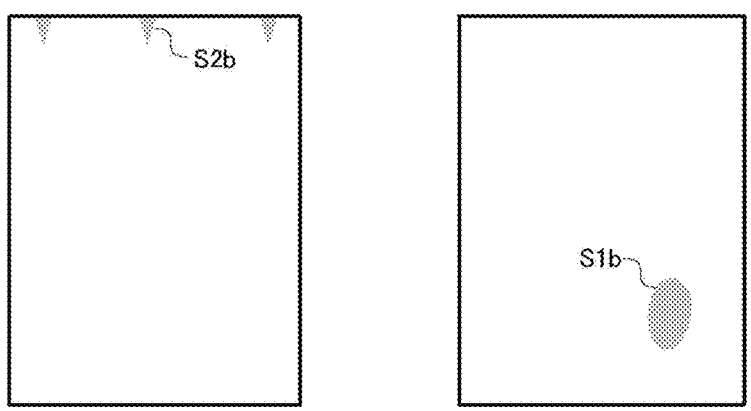

FIGS. 10A to 10C illustrate the differential image data representing the printing paper sheet P to be discharged after the ink stain is detected. FIG. 10A illustrates the island-shaped ink stain S1 and the streak-shaped ink stains S2 of the printing paper sheets P when the ink stain is detected. FIGS. 10B and 10C illustrate the ink stains of the printing paper sheets P that remain inside the medium conveying unit 150 and are conveyed in the order when the ink stain is detected. All of an island-shaped ink stain S1a and streak-shaped ink stains S2a (see FIG. 10B) are thinner than the island-shaped ink stain S1 and the streak-shaped ink stains S2 (see FIG. 10A) and darker than an island-shaped ink stain S1b and streak-shaped ink stains S2b (see FIG. 10C).

Both image regions (also referred to as specific image regions) of the island-shaped ink stain S1a and the streak-shaped ink stain S2a (see FIG. 10B) are narrower (areas are reduced) than image regions (also referred to as specific image regions) of the island-shaped ink stain S1 and the streak-shaped ink stain S2 (see FIG. 10A) and are wider than those of the island-shaped ink stain S1b and the streak-shaped ink stain S2b (see FIG. 10C). Note that the medium image data representing, for example, the island-shaped ink stain S1, the island-shaped ink stain S1a, and the island-shaped ink stain S1b are continuously generated, image data that is relatively precedingly generated is also referred to as first medium image data, and image data that is generated relatively later is also referred to as second medium image data.

Based on such an image transition state, the abnormality estimator 220 can estimate that the ink attached to the medium conveying unit 150 or the printing conveyance belt 125 is stably reduced for each conveyance of the printing paper sheet P. In such a case, the abnormality estimator 220 can also display a possibility of solving the ink to be attached to the medium conveying unit 150 and the printing conveyance belt 125 by resuming the paper feeding from the medium storage unit 160 (also referred to as a simple paper feeding without the ejection of the ink) via the operation display unit 230.

The abnormality estimator 220 estimates the number of the printing paper sheets P consumed until the inks attached to the medium conveying unit 150 and the printing conveyance belt 125 disappear and can also display the estimated number of the printing paper sheets P and an icon for starting the simple paper feeding on the operation display unit 230. The abnormality estimator 220 may display a method for cleaning the medium conveying unit 150 and the printing conveyance belt 125 on the operation display unit 230.

Figure 11:
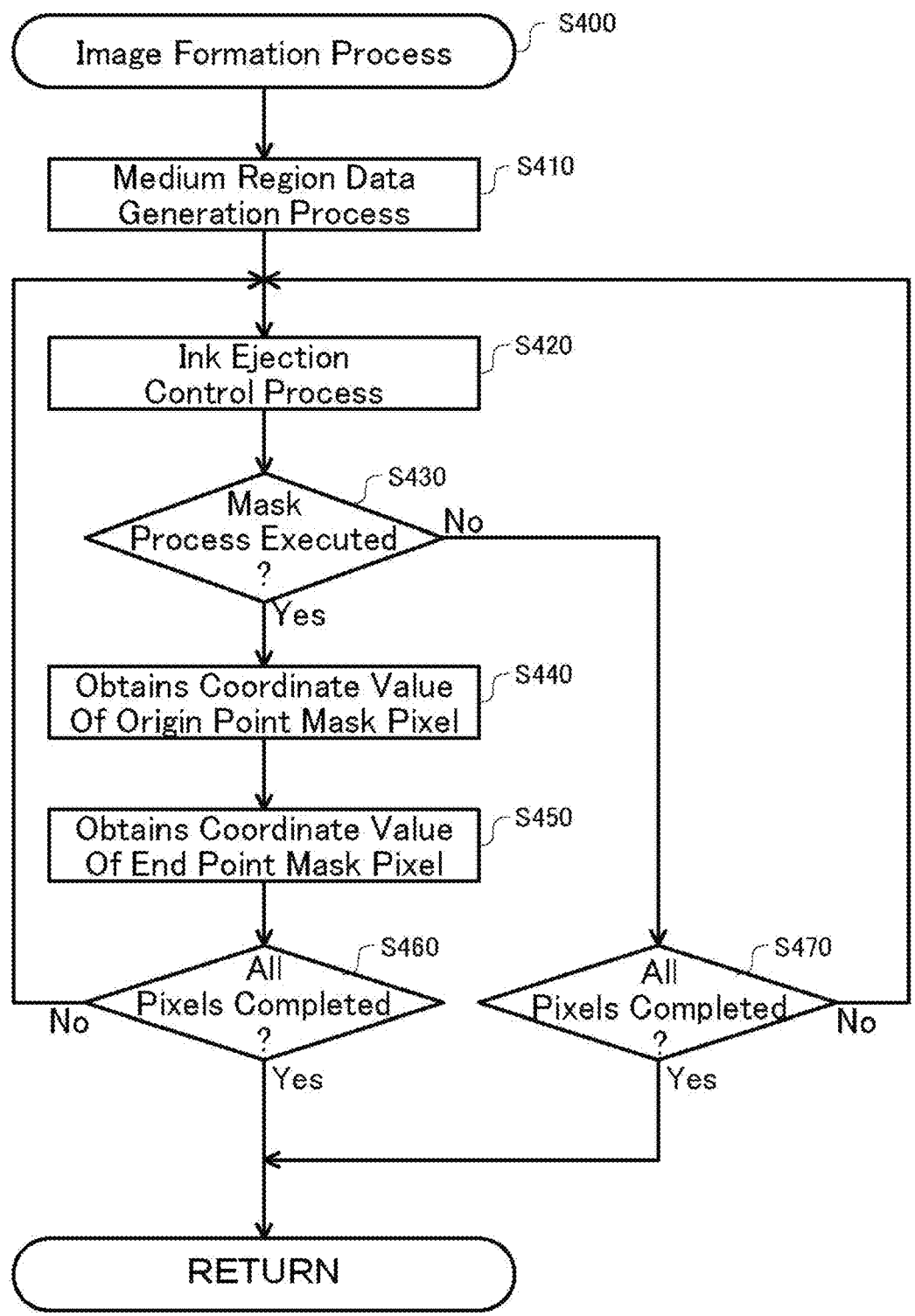
FIG. 11 illustrates a content of an image formation process according to the one embodiment.
Figure 12:
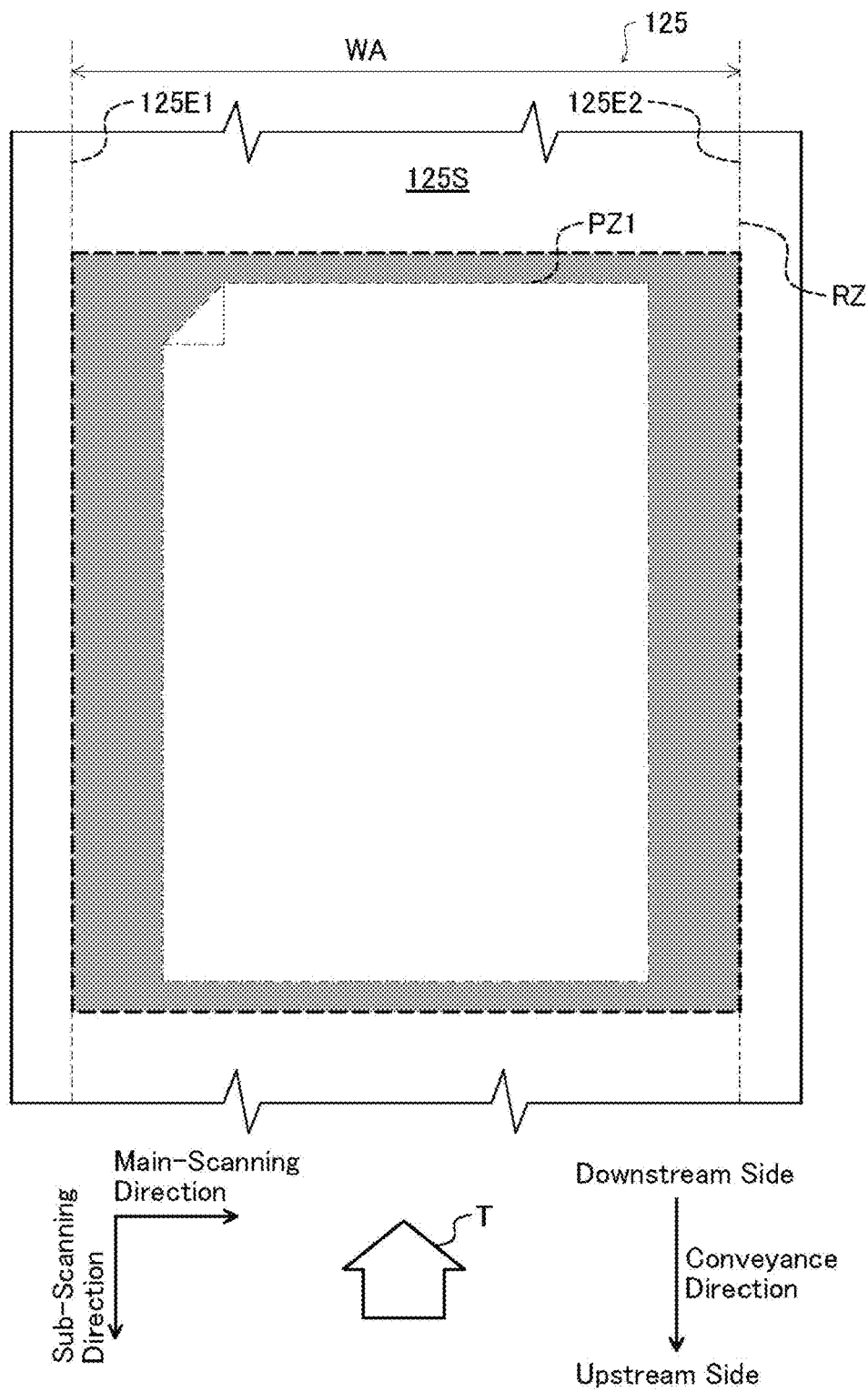
FIG. 12 illustrates a medium conveying surface of a printing conveyance belt according to the one embodiment.

FIG. 11 illustrates a content of an image formation process (Step S400) according to the one embodiment. FIG. 12 illustrates the medium conveying surface 125S of the printing conveyance belt 125 according to the one embodiment. In this example, the medium conveying surface 125S conveys A3 size printing paper sheets P supplied from the medium storage unit 160 in a conveyance direction T to supply them to the image forming unit 120. A color of the medium conveying surface 125S is a color significantly different from white, such as a gray color.

In the medium conveying surface 125S, a printable width WA as the maximum printable width in the main-scanning direction is set. The printable width WA is set between a first printable-end-portion position 125E1 and a second printable-end-portion position 125E2. The image forming unit 120 can eject the ink within a range of the printable width WA.

At Step S410, the mask data generating unit 123 executes a medium region data generation process. At the medium region data generation process, the mask data generating unit 123 sets a threshold value for distinguishing a color of the printing paper sheet P from the gray color of the medium conveying surface 125S of the printing conveyance belt 125 to perform binarization. The mask data generating unit 123 generates the medium region data from the medium image data by setting a pixel value of a pixel representing the printing paper sheet P to "0," and setting a pixel value of a pixel representing the medium conveying surface 125S to "1."

The mask data generating unit 123 generates the medium region data by mapping binary data to a coordinate system of the print data within the image reading zone RZ. In this embodiment, the medium region data is data for identifying an image formable region, which is a region on the printing paper sheet where an image formation can be performed in the coordinate system of the print data. The mask data generating unit 123 stores the medium region data in the storage unit 140.

At Step S420, the control unit 110 executes an ink ejection control process. At the ink ejection control process, the control unit 110 generates control data for an ink ejection process based on the print data. Specifically, the control unit 110 selects a target pixel to be processed in print data of CMYK, outputs a control signal for ejecting the ink to the ejection control circuit 122 to set a state (ink ejection target) where the ink can be ejected at a predetermined ink droplet size when the pixel value of the medium region data corresponding to the target pixel is "0," and masks (cuts) the control signal to eliminate (inhibit or restrict) the ejection of the ink (also referred to as a mask process or an ejection restriction process) when the pixel value of the medium region data is "1." Note that, in a broad sense, it is only necessary that the ejection restriction process is a process that not only masks the control signal but also restricts the ejection and includes, for example, a process that changes a logical value by a logical process that handles the control signal (restricts the ejection by, for example, a process of AND operation with "0" (representing no ejecting)) to change the control data.

At Step S430, when the mask process is executed, the control unit 110 advances the process to Step S440. When the mask process is not executed, the control unit 110 advances the process to Step S470. At Step S470, the control unit 110 returns the process to Step S430 until the processes of all the pixels are completed, and executes the ink ejection control process on the next target pixel.

At Step S440, the control unit 110 obtains coordinate values of an origin point mask pixel. The origin point mask pixel is a coordinate of the pixel on which the mask process is executed first in the print target region PA as a print target region based on the print data.

At Step S450, the control unit 110 obtains coordinate values of an end point mask pixel. The end point mask pixel is a coordinate of the pixel on which the mask process is executed last in the print target region PA as the print target region based on the print data.

At Step S460, the control unit 110 returns the process to Step S420 until the processes of all of the pixels are completed, and executes the ink ejection control process on the next target pixel. Thus, since coordinate data representing mask pixels at or after the second time sequentially stored in a storage area of the storage unit 140 and is updated, and the coordinate of the pixel on which the mask process is executed last is stored as a result.

At Step S490 (see FIG. 4), when the mask process has been already executed on at least one pixel, the control unit 110 advances the process to Step S500. When the mask process has never been executed, the control unit 110 advances the process to Step S800. At Step S800, the control unit 110 returns the process to Step S300 until the number of printed sheets reaches the set number of sheets and executes the image formation process on the next printing paper sheet.

At Step S500, the control unit 110 executes the printing stop process after the printing where the mask process has been executed is completed. That is, the control unit 110 stops the printing after an image formation on the printing paper sheet on which the mask process has been executed is completed. The reason why the image formation on the printing paper sheet on which the mask process has been executed is completed is that it is used for identifying an abnormality of the printing paper sheet. The control unit 110 notifies the image forming apparatus 100 of the stop of the printing process and transmits the coordinate values of the origin point mask pixel and the end point mask pixel to the personal computer 200.

At Step S600, the abnormality estimator 220 executes the abnormal mode estimation process. At the abnormal mode estimation process, the abnormality estimator 220 reads the image data as a target of the printing process from the storage unit 240 to estimate the cause of the abnormality of the printing paper sheet that is a cause of the mask process by using the coordinate values of the origin point mask pixel, the coordinate value of the end point mask pixel, and the image data.

The abnormality estimator 220 converts the coordinate values of the origin point mask pixel and the end point mask pixel into values of the coordinate system based on the pixel of the image data before the RIP process. Thus, the coordinate values of the origin point mask pixel and the end point mask pixel become the coordinate values indicating a relative position with respect to the image represented by the image data.

Figure 13A:
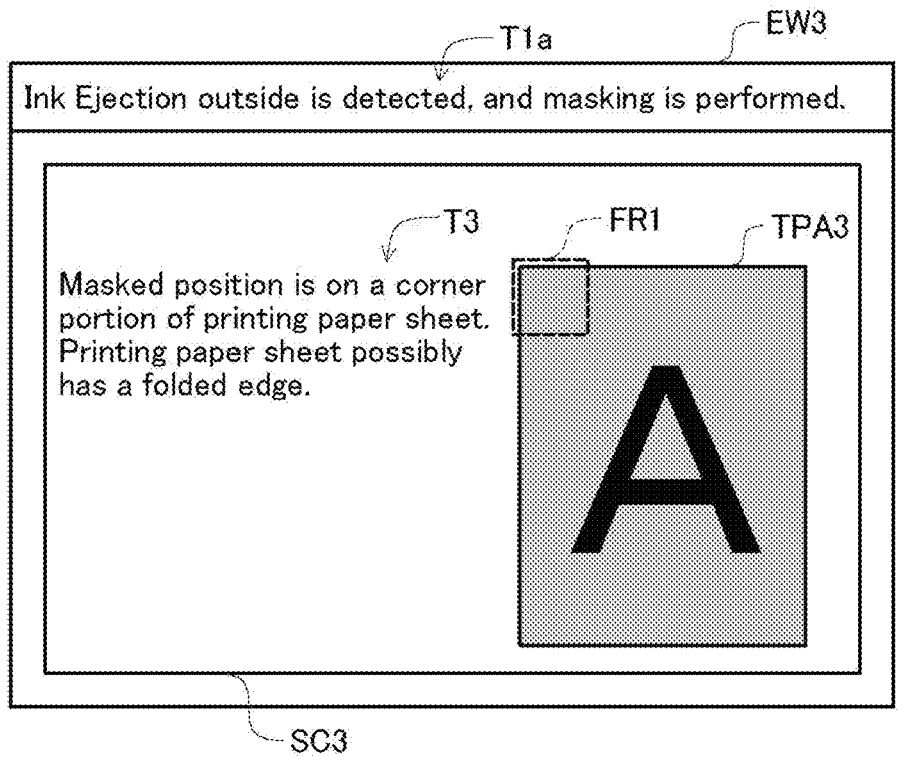
FIGS. 13A and 13B illustrate an abnormal state of the printing paper sheet that has become a target to be mask processed.
Figure 13B:
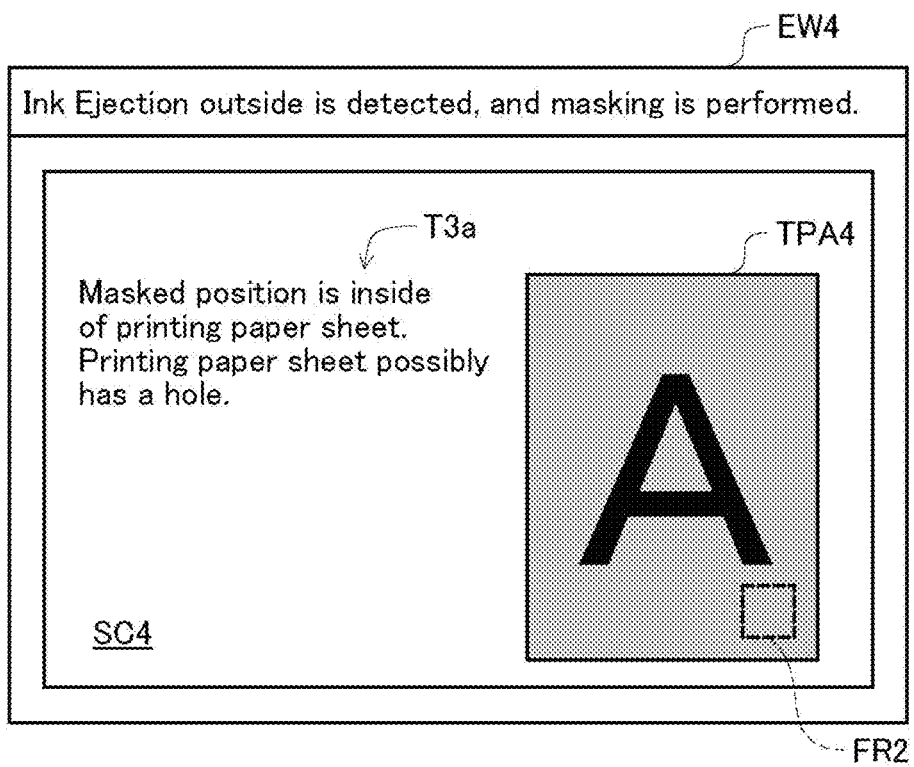

FIGS. 13A and 13B illustrate an abnormal state of the printing paper sheet that has become a target to be mask processed. FIG. 13A is an explanatory diagram illustrating an error display screen EW3 indicating a folded edge as an abnormality estimation result. In this example, the folded edge occurs on the printing paper sheet P, and the ejection-outside-of-medium region Ms1 (see FIG. 3) is generated due to the folded edge. The ejection-outside-of-medium region Ms1 would be a region located outside the printing paper sheet to which the ink is ejected if the mask process were not executed.

The error display screen EW3 includes a text message T1a indicating that the mask process is executed, and a description region SC3 illustrating its state. The description region SC3 includes a text message T3 indicating the state of the abnormality estimation result, and a print target image TPA3 on which a frame display FR1 is superimposed. The frame display FR1 is a frame symbol (simply referred to as a display) illustrating the region on which the mask process is executed. The text message T1 and the text message T2 are generated by the abnormality estimator 220 by preparing them from, for example, a list of preliminarily prepared text messages.

The text message T1a is a text display of "Ink Ejection outside printing paper sheet is detected, and mask process is performed." and indicates that the ejection of the ink outside the printing paper sheet has been detected in advance as the state of the abnormality, and the ejection has been avoided. The text message T3 indicates that the abnormality estimator 220 interprets that the abnormality regarding the printing paper sheet is estimated as "folded edge," and as a basis of that, "Masked position is on a corner portion of printing paper sheet." The text message indicating the estimation result of the cause of generating the target to be mask processed is also referred to as the first text message. The text message indicating the interpretation serving as the basis of the estimation result is also referred to as the second text message.

The print target image TPA3 is displayed based on the image data read from the storage unit 240. The print target image TPA3 is an image assuming that the printing paper sheet P is normal and thus the mask process is not executed. The frame display FR1 is a frame symbol of a rectangular where the coordinate values of the origin point mask pixel and the coordinate values of the end point mask pixel are diagonal or a slightly larger rectangular than that. The frame display FR1 is illustrated including the region on which the mask process has been executed using the frame symbol of the slightly larger rectangular.

Thus, the user can identify the state of the abnormality by examining the printed matter printed in association with the mask process with reference to the state on the error display screen EW3. At this time, the user can identify the state of the abnormality considering "folded edge" as the first candidate of error mode, and an interpretation of the image of the masking target by the image forming apparatus 100 is displayed. The masking target is a region for the target of the masking process and serves as the basis of the determination, thus ensuring reducing the burden of the user when identifying the abnormality.

FIG. 13B illustrates a case where the cause of generating the ejection-outside-of-medium region Ms2 (see FIG. 3) is a hole in the printing paper sheet. When there is a hole in the printing paper sheet P, the monochrome line scanner 123S generates the medium region data indicating the medium region PZ2. FIG. 13B illustrates an error display screen EW4 when the abnormality estimation result of the printing paper sheet is the hole. In a description region SC4 of the error display screen EW4, a text message T3a indicates that the abnormality estimator 220 interprets that the abnormality regarding the printing paper sheet is estimated as "hole," and as a basis of that, "Masked position is inside the printing paper sheet." A frame display FR2 superimposed on a print target image TPA4 illustrates the region on which the mask process has been executed, that is, the region that has been estimated to have the hole, using a rectangular symbol.

Thus, the user can identify the state of the abnormality at a small burden by examining the printed matter printed in association with the mask process with reference to the state on the error display screen EW4 and considering "hole" as a first candidate of an error mode.

Thus, the image forming apparatus 100 is configured such that the mask process avoids the ink from being ejected to the region outside the printing paper sheet P even if there is the abnormality, such as the folded edge or the hole, in the printing paper sheet P. Meanwhile, even when the mask process does not function normally and the ink is ejected onto the printing conveyance belt 125, the image forming apparatus 100 achieves a fail-safe for ensuring the detection at the duplex printing.

Thus, the image forming apparatus 100 according to the one embodiment can reliably eject the ink onto the printing paper sheet by the mask process and can automatically detect the ink stain at the duplex printing even if the ink is ejected outside the printing paper sheet and the ink is attached to the printing conveyance belt 125 or the medium conveying unit 150 to stain the printing paper sheet P.

Furthermore, this image forming apparatus 100 has an advantage in that it can provide a material for determining whether the ink is attached to the printing conveyance belt 125 or not, and/or whether the ink is attached to the medium conveying unit 150 (in particular, the warp correcting unit 522) or not, based on the patterns of the ink stain generated in the printing paper sheet. In addition, the image forming apparatus 100 can identify the cause of the ink stain in view of a presence/absence of the mask process and its state.

In addition to the above-described embodiment, the disclosure can also be embodied by the following modifications.

First Modification

While in the above-described embodiment the mask data generating unit includes the CIS type monochrome line scanner, a color scanner may be employed.

Second Modification

While in the above-described embodiment the abnormality estimator 220 estimates a situation and cause of an ink attachment using the monochrome image data generated with the monochrome line scanner, for example, the abnormality estimator 220 may use color image data to be used at the printed matter quality confirmation process that is stored in the storage unit to estimate the situation and cause of the ink attachment in response to the detection of the ink stain. Doing so ensures separately analyzing an ink attachment situation of CMYK.

Third Modification

While in the above-described embodiment the medium region data has the same resolution as that of the image formation control data, the resolution of the medium region data, may be, for example, a half resolution of the image formation control data. In this case, it is determined whether each group of four pixels of the image formation control data becomes the target to be mask processed or not based on one pixel of the medium region data.

Fourth Modification

While in the above-described embodiment the disclosure is applied to the image forming system, which includes the image forming apparatus and the personal computer, the disclosure is also applicable to an image forming apparatus alone. In a broad sense, the image forming apparatus also includes the image forming system.

EFFECT OF THE DISCLOSURE

The disclosure can provide a technique for supporting identification of a cause of a stain at a print output.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An image forming method comprising:
   storing an image forming medium in a medium storage unit;
   forming an image using an image forming unit that ejects an ink onto the image forming medium based on input image data to form an input image;
   conveying the image forming medium using a first conveying unit that conveys the image forming medium from the medium storage unit to the image forming unit, a second conveying unit that conveys the image forming medium from the image forming unit, a reverse conveying unit that conveys the image forming medium from the second conveying unit to reverse the image forming medium to convey the reversed image forming medium to the image forming unit, and a conveyance output unit that outputs the image forming medium from the second conveying unit;

imaging the image forming medium in the image forming unit to generate medium image data representing the image forming medium;

generating image formation control data for reproducing the input image data by forming ink dots in a plurality of pixels constituting the input image;

using the medium image data to generate medium region data for identifying an image formable region as a region on the image forming medium on which the image is formable;

controlling an image formation in a plurality of modes including a single-side image forming mode and a duplex image forming mode by selecting a target pixel from the plurality of pixels to determine whether the selected target pixel is located within the image formable region or not based on the medium region data, the target pixel being set as an ink ejection target when the selected target pixel is located within the image formable region, the target pixel being set as a target of an ejection restricted process at which the ejection of the ink is restricted when the selected target pixel is located outside the image formable region; and detecting an ink stain based on tone differences between first medium image data and second medium image data by comparing the first medium image data as medium image data representing one surface of the image forming medium and the second medium image data as medium image data representing another surface of the image forming medium when the duplex image forming mode is selected; wherein the controlling includes setting the whole image formable region as the target of the ejection restriction process in response to the detection of the ink stain to inhibit an ejection of the ink to the other surface of the image forming medium.

2. The image forming method according to claim 1, wherein:

the imaging includes generating monochrome image data having luminance values as the medium image data using a monochrome sensor; and the detecting includes detecting the ink stain when a specific image region constituted by a plurality of pixels having differences of the luminance values as the tone differences larger than a preliminarily set threshold value has an area equal to or more than a preliminarily set area.

3. The image forming method according to claim 2, wherein the detecting includes estimating a possibility that an ink has been attached to the image forming unit when the specific image region includes an island-shaped ink stain.

4. The image forming method according to claim 2, wherein the detecting includes estimating a possibility that an ink has been attached to the second conveying unit or the reverse conveying unit when the specific image region includes a specific streak-shaped ink stain.

5. The image forming method according to claim 2, wherein the detecting includes continuing the conveyance of the image forming medium while the specific image region in the medium image data is continuously reduced and the tone differences of the specific image region is continuously reduced after the ink stain is detected, the medium image data being continuously generated based on differences between the first medium image data and the second medium image data of the image forming media to be continuously conveyed.

6. The image forming method according to claim 5, wherein the detecting includes continuing the conveyance of the image forming medium while the specific image region is reduced and the tone differences of the specific image region is reduced in the continuously generated medium image data when the specific image region includes the island-shaped ink stain.

7. The image forming method according to claim 6 further comprising displaying an image used for determining the continuance of conveying the image forming medium or a cleaning of at least any one of the image forming unit, the second conveying unit, and the reverse conveying unit, based on the continuously generated medium image data.

8. An image forming apparatus comprising:

a medium storage unit that stores an image forming medium;

an image forming unit that forms an image by ejecting an ink onto the image forming medium based on input image data to form an input image;

a medium conveying unit that conveys the image forming medium using a first conveying unit that conveys the image forming medium from the medium storage unit to the image forming unit, a second conveying unit that conveys the image forming medium from the image forming unit, a reverse conveying unit that conveys the image forming medium from the second conveying unit to reverse the image forming medium to convey the reversed image forming medium to the image forming unit, and a conveyance output unit that outputs the image forming medium from the second conveying unit;

a medium reading unit that images the image forming medium in the image forming unit to generate medium image data representing the image forming medium;

an image processing unit that generates image formation control data for reproducing the input image data by forming ink dots in a plurality of pixels constituting the input image;

a medium region setting unit that uses the medium image data to generate medium region data for identifying an image formable region as a region on the image forming medium on which the image is formable;

a control unit that controls an image formation in a plurality of modes including a single-side image forming mode and a duplex image forming mode by selecting a target pixel from the plurality of pixels to determine whether the selected target pixel is located within the image formable region or not based on the medium region data, the target pixel being set as an ink ejection target when the selected target pixel is located within the image formable region, the target pixel being set as a target of an ejection restricted process at which the ejection of the ink is restricted when the selected target pixel is located outside the image formable region; and an ink stain detector that detects an ink stain based on tone differences between first medium image data and second medium image data by comparing the first medium image data as medium image data representing one surface of the image forming medium and the second medium image data as medium image data representing another surface of the image forming medium when the duplex image forming mode is selected; wherein the control unit controls setting the whole image formable region as the target of the ejection restriction process in response to the detection of the ink stain to inhibit an ejection of the ink to the other surface of the image forming medium.

9. The image forming apparatus according to claim 8, wherein:
the medium reading unit generates monochrome image data having luminance values as the medium image data using a monochrome sensor; and
the ink stain detector detects the ink stain when a specific image region constituted by a plurality of pixels having differences of the luminance values as the tone differences larger than a preliminarily set threshold value has an area equal to or more than a preliminarily set area.

10. The image forming apparatus according to claim 9, wherein the ink stain detector estimates a possibility that an ink has been attached to the image forming unit when the specific image region includes an island-shaped ink stain.

11. The image forming apparatus according to claim 9, wherein the ink stain detector estimates a possibility that an ink has been attached to the second conveying unit or the reverse conveying unit when the specific image region includes a specific streak-shaped ink stain.

12. The image forming apparatus according to claim 9, wherein the ink stain detector continues the conveyance of the image forming medium while the specific image region in the medium image data is continuously reduced and the tone differences of the specific image region is continuously reduced after the ink stain is detected, the medium image data being continuously generated based on differences between the first medium image data and the second medium image data of the image forming media to be continuously conveyed.

13. The image forming apparatus according to claim 12, wherein the ink stain detector continues the conveyance of the image forming medium while the specific image region is reduced and the tone differences of the specific image region is reduced in the continuously generated medium image data when the specific image region includes the island-shaped ink stain.

14. The image forming apparatus according to claim 12, further comprising an operation display unit that displays an image used for determining the continuance of conveying the image forming medium or a cleaning of at least any one of the image forming unit, the second conveying unit, and the reverse conveying unit, based on the continuously generated medium image data.

15. A non-transitory computer-readable recording medium storing a control program for controlling an image forming apparatus, the image forming apparatus including a processor and a memory, the recording medium storing a program instruction that causes the image forming apparatus to function as:
a medium storage unit that stores an image forming medium,
an image forming unit that forms an image by ejecting an ink onto the image forming medium based on input image data to form an input image, and
a medium conveying unit that conveys the image forming medium using a first conveying unit that conveys the image forming medium from the medium storage unit to the image forming unit, a second conveying unit that conveys the image forming medium from the image forming unit, a reverse conveying unit that conveys the image forming medium from the second conveying unit to reverse the image forming medium to convey the reversed image forming medium to the image forming unit, and a conveyance output unit that outputs the image forming medium from the second conveying unit;
the program instruction causing the image forming apparatus to function as
a medium reading unit that images the image forming medium in the image forming unit to generate medium image data representing the image forming medium,
an image processing unit that generates image formation control data for reproducing the input image data by forming ink dots in a plurality of pixels constituting the input image,
a medium region setting unit that uses the medium image data to generate medium region data for identifying an image formable region as a region on the image forming medium on which the image is formable,
a control unit that controls an image formation in a plurality of modes including a single-side image forming mode and a duplex image forming mode by selecting a target pixel from the plurality of pixels to determine whether the selected target pixel is located within the image formable region or not based on the medium region data, the target pixel being set as an ink ejection target when the selected target pixel is located within the image formable region, the target pixel being set as a target of an ejection restricted process at which the ejection of the ink is restricted when the selected target pixel is located outside the image formable region, and
an ink stain detector that detects an ink stain based on tone differences between first medium image data and second medium image data by comparing the first medium image data as medium image data representing one surface of the image forming medium and the second medium image data as medium image data representing another surface of the image forming medium when the duplex image forming mode is selected; and
the control unit controls setting the whole image formable region as the target of the ejection restriction process in response to the detection of the ink stain to inhibit an ejection of the ink to the other surface of the image forming medium.

16. The recording medium according to claim 15, wherein:
the medium reading unit generates monochrome image data having luminance values as the medium image data using a monochrome sensor; and
the ink stain detector detects the ink stain when a specific image region constituted by a plurality of pixels having differences of the luminance values as the tone differences larger than a preliminarily set threshold value has an area equal to or more than a preliminarily set area.

17. The recording medium according to claim 16, wherein the ink stain detector estimates a possibility that an ink has been attached to the image forming unit when the specific image region includes an island-shaped ink stain.

18. The recording medium according to claim 16, wherein the ink stain detector estimates a possibility that an ink has been attached to the second conveying unit or the reverse conveying unit when the specific image region includes a specific streak-shaped ink stain.

19. The recording medium according to claim 16, wherein the ink stain detector continues the conveyance of the image forming medium while the specific image region in the medium image data is continuously reduced and the tone differences of the specific image region is continuously reduced after the ink stain is detected, the medium image data being continuously generated based on differences between the first medium image data and the second medium image data of the image forming media to be continuously conveyed.

20. The recording medium according to claim 19, wherein the ink stain detector continues the conveyance of the image forming medium while the specific image region is reduced and the tone differences of the specific image region is reduced in the continuously generated medium image data when the specific image region includes the island-shaped ink stain.

* * * * *